Dec. 1, 1959 T. W. MERRITT 2,915,072
MILK PIPE LINE WASHING SYSTEM
Filed Feb. 2, 1955 7 Sheets-Sheet 1

Inventor
Thomas W. Merritt
By
Schroeder, Hofgren, Brady & Wegner
attorneys

Dec. 1, 1959 T. W. MERRITT 2,915,072
MILK PIPE LINE WASHING SYSTEM
Filed Feb. 2, 1955 7 Sheets-Sheet 2

Inventor
Thomas W. Merritt
By
Schroeder, Hofgren, Brady & Wegner
Attorneys

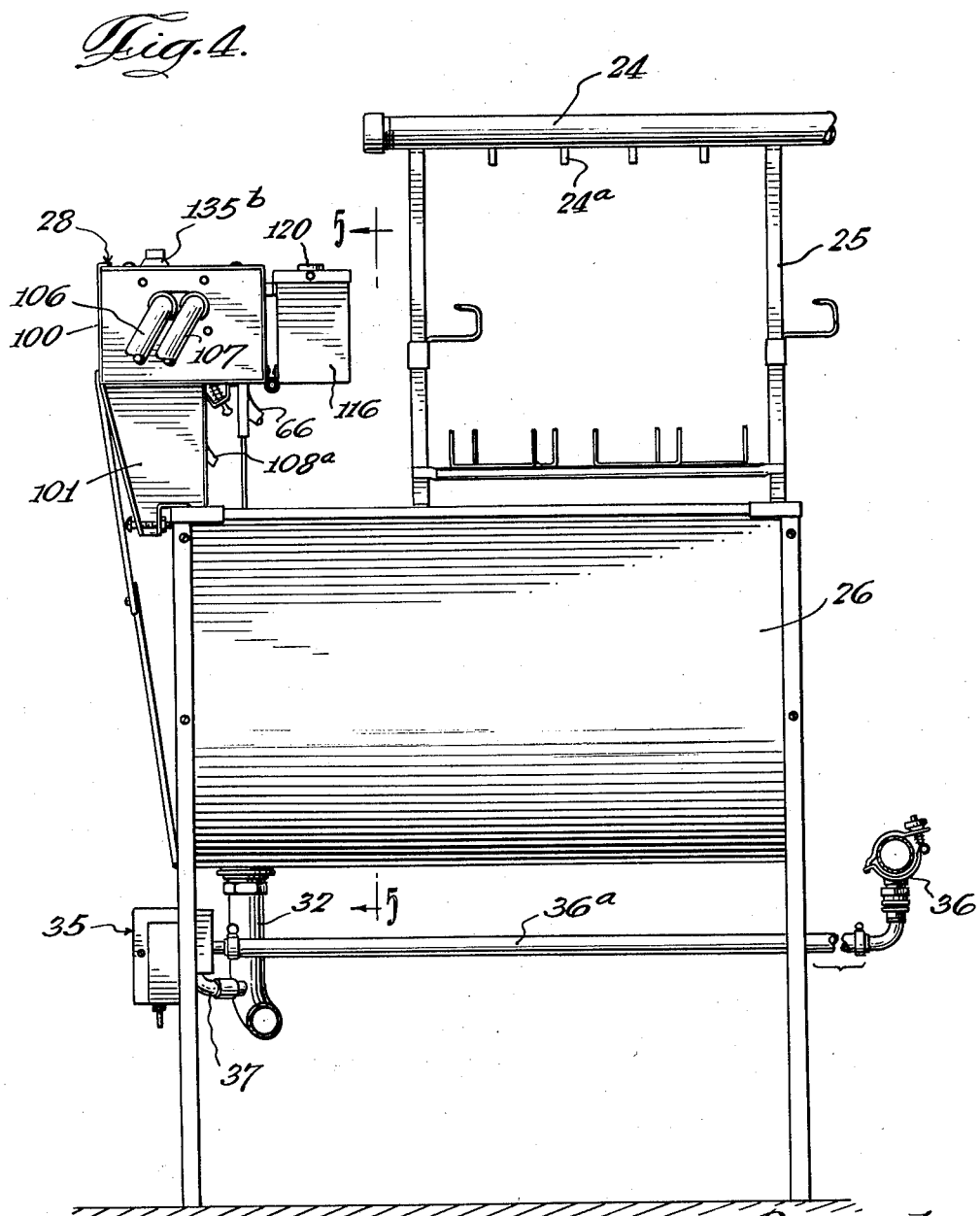

Dec. 1, 1959     T. W. MERRITT     2,915,072
MILK PIPE LINE WASHING SYSTEM
Filed Feb. 2, 1955     7 Sheets-Sheet 4

Dec. 1, 1959  T. W. MERRITT  2,915,072
MILK PIPE LINE WASHING SYSTEM
Filed Feb. 2, 1955  7 Sheets-Sheet 5

Inventor
Thomas W. Merritt
By
Schroeder, Hofgren, Brady & Wegner
Attorneys

Dec. 1, 1959  T. W. MERRITT  2,915,072
MILK PIPE LINE WASHING SYSTEM
Filed Feb. 2, 1955  7 Sheets-Sheet 6

Inventor
Thomas W. Merritt
By
Schroeder, Hofgren, Brady & Wegner
Attorneys

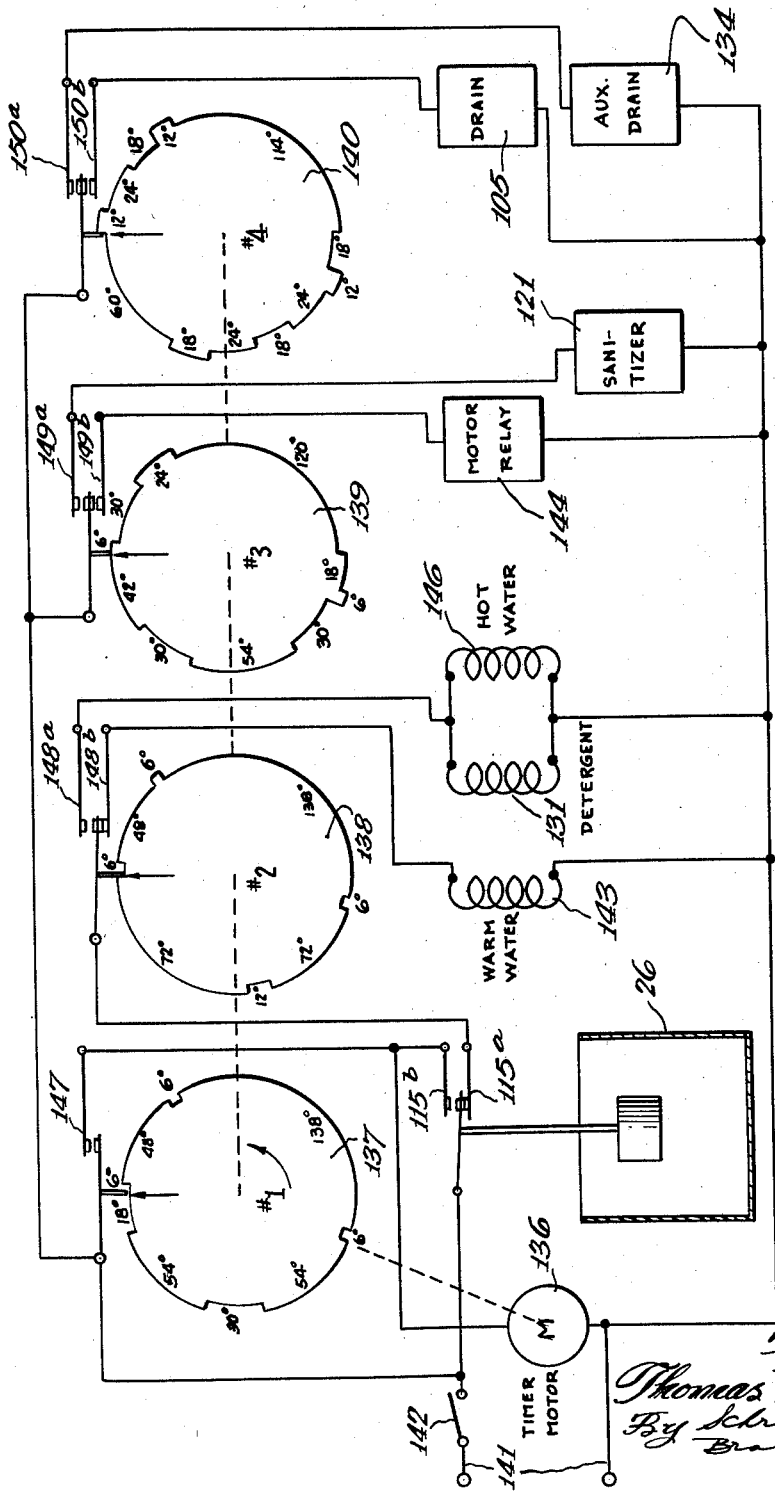

United States Patent Office 2,915,072
Patented Dec. 1, 1959

2,915,072

MILK PIPE LINE WASHING SYSTEM

Thomas W. Merritt, St. Charles, Ill., assignor to Babson Bros. Co., a corporation of Illinois Application February 2, 1955, Serial No. 485,773

11 Claims. (Cl. 134—57)

This invention is concerned with a washing system for carry-away milk pipe lines and more particularly with an automatic system for rinsing, washing and sanitizing a milk pipe line.

Milking systems in which the milk is delivered from the animal either directly, or after measuring or weighing, into a milk pipe line through which it flows to a remote storage tank or the like, are well known. Carry-away systems, as contrasted with bucket milkers where the milk flows directly into a bucket at or near the animal, have been used to some extent for several decades. In the last few years, however, the development of carry-away milking systems has accelerated greatly and where they were formerly used almost exclusively by large dairy farms, they are now to be found on many small farms where possibly only a dozen or so cows are milked.

While carry-away milking systems greatly facilitate the handling of the milk and relieve the farmer from a lot of physical labor, they present certain problems in connection with sanitation. It is necessary of course that all milk contacted portions of the milking system be thoroughly washed with a suitable cleansing agent and sanitized following each milking operation, normally twice each day. In some areas, due to local health codes, it is also necessary to sanitize the system immediately prior to the beginning of the milking operation.

In the early days of pipe line milking, it was necessary for the farmer to disassemble the system completely and to wash the sections of pipe line and other system components by hand and then to reassemble the system prior to the next milking operation. This was a laborious and time-consuming operation and offset to a large extent the milk handling advantages gained by use of the carry-away system. In recent years, systems have been developed and health codes amended to permit cleaning of the carry-away pipe lines without first disassembling them. Such systems are often referred to as "cleaned in place" or, more briefly, "CIP" systems.

Even with cleaned in place systems, however, it is necessary for the farmer or operator to supervise the washing operation. He must prepared the washing solutions, control the washing solution circulating means and drain each washing solution from the system after it has circulated for a sufficient period of time. It normally takes about an hour to do a thorough job of washing.

A principal object of the present invention is the provision of a completely automatic milk pipe line washing system which, after once having been started, controls the preparation and the circulation of washing solutions through the system and the drainage of each solution therefrom after the proper, predetermined period of circulation.

One feature of the invention is that the washing system comprises means for circulating a washing solution through a pipe line and means for automatically providing the pipe line with a desired solution, for controlling the circulating means and for the draining of the pipe line on completion of a predetermined period of circulation. Another feature is that a plurality of washing solutions of predetermined character are sequentially prepared and circulated through the pipe line. A further feature is that the system includes electrically operated means for controlling a water supply, circulating means, an additive supply and a drain, a timer including a plurality of cam-operated switches and circuit means interconnecting the switches and the control means for automatically, sequentially filling the reservoir with washing solutions, circulating each solution through the pipe line and draining the pipe line following the circulation of each solution.

Still another feature is the provision, in a milk pipe line washing system including a carry-away milk pipe line, a source of water and means for circulating washing solution through the pipe line, of a control unit comprising a timer, valve means responsive to the timer for controlling the flow of water from the source to the system, a supply of additive material, means responsive to the timer for mixing the material with the water to form a washing solution, means responsive to the timer for controlling the circulating means, and drain means responsive to the timer for emptying the system, the timer controlling the sequential preparation, circulation and drainage of a washing solution. Yet a further feature is that the control unit is at least partially contained in a housing mounted on the edge of a washing solution reservoir and includes a water mixing valve with an outlet emptying directly into the reservoir. And another feature is that the reservoir includes a drain opening and the control unit includes a stopper for the drain which is secured to an operating shaft extending into the control unit housing where it is connected to a solenoid for operating the drain. A further feature is that a container for additive materials is mounted on the control unit housing and overhanging the reservoir, and the control unit includes an electrically operated latch for emptying the contents of the container into the reservoir.

Still another feature is the provision of a method of washing a carry-away milk pipe line comprising filling the pipe line with a washing solution, circulating the washing solution through the pipe line, and automatically draining the pipe line on completion of a predetermined period of circulation.

Further features and advantages will readily be apparent from the following specification and from the drawings, in which:

Figure 4 is a side elevational view of the washing solution reservoir with the control unit mounted thereon;

Figure 9 is a schematic diagram of the electrical control circuit for the washing system;

The usual practice in washing a milk pipe line is to flush the line first with plain water, then to wash it with a detergent solution and finally to circulate therethrough a sanitizing solution. It is to be understood that the term "washing solution" as used throughout the specification and claims is intended to cover not only a solution of an additive material in water but also plain water when it is circulated through the system.

The control unit which forms an important part of the automatic pipe line washing system includes a timer, which is preferably electrically operated, and which actuates the various elements that control the system operation. The unit includes a temperature responsive mixing valve which introduces water of the desired temperature into the reservoir and a float for gauging the height of water therein and for closing the valve when the reservoir is full. A reservoir drain is actuated, as by a solenoid in the unit, to drain the system. The control unit also includes supplies of desired additives, as a detergent washing powder and a sanitizing preparation which are selectively introduced into the reservoir under the control of the timing means to provide certain of the desired washing solutions. The timer also controls the operation of the washing solution circulating means. The particular structure and arrangement of the control unit will be described later, the foregoing brief description of the function thereof being given to facilitate an understanding of the following description of different pipe line washing systems.

Figure 1:
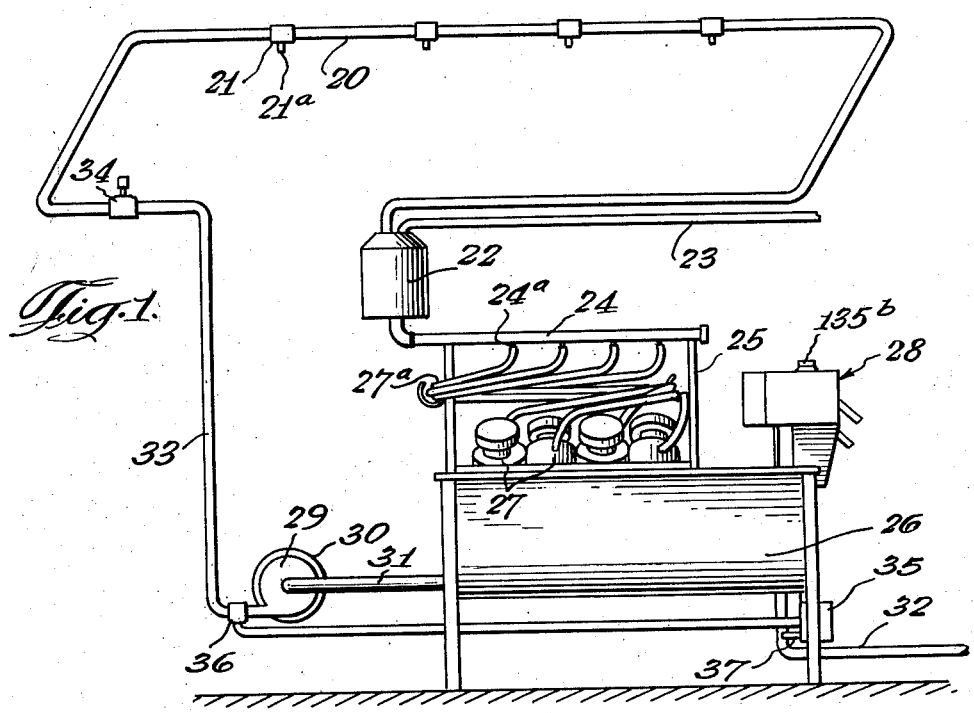
Figure 1 is a diagrammatic view of a milk pipe pipe line washing system embodying the invention.
Figure 2:
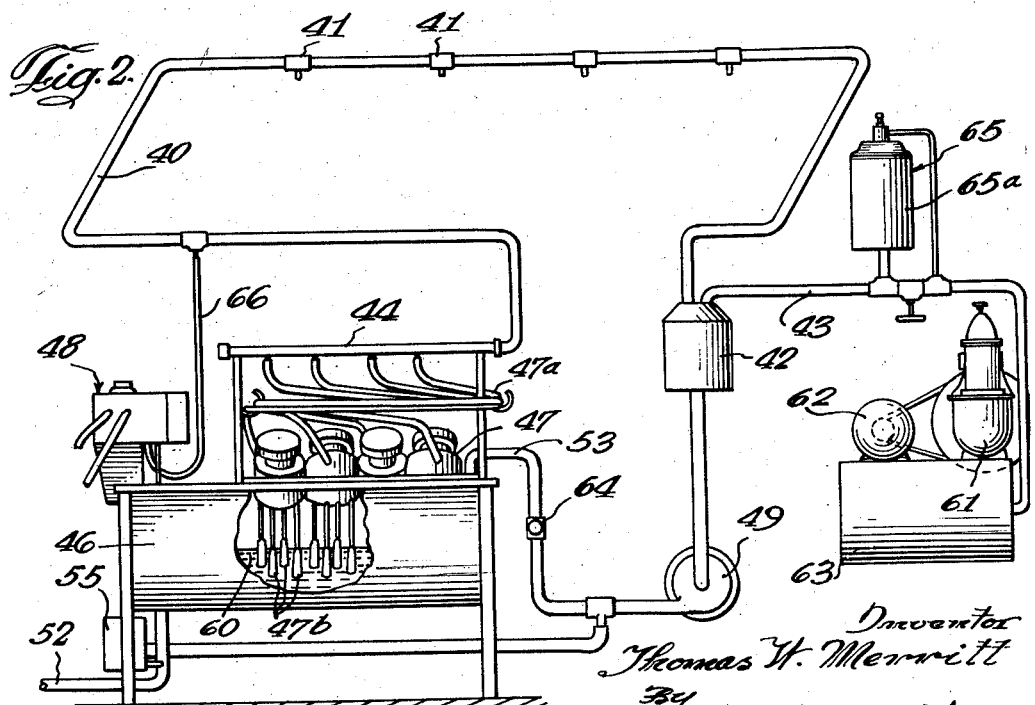
Figure 2 is a diagrammatic view of another milk pipe line washing system embodying the invention.
Figure 3:
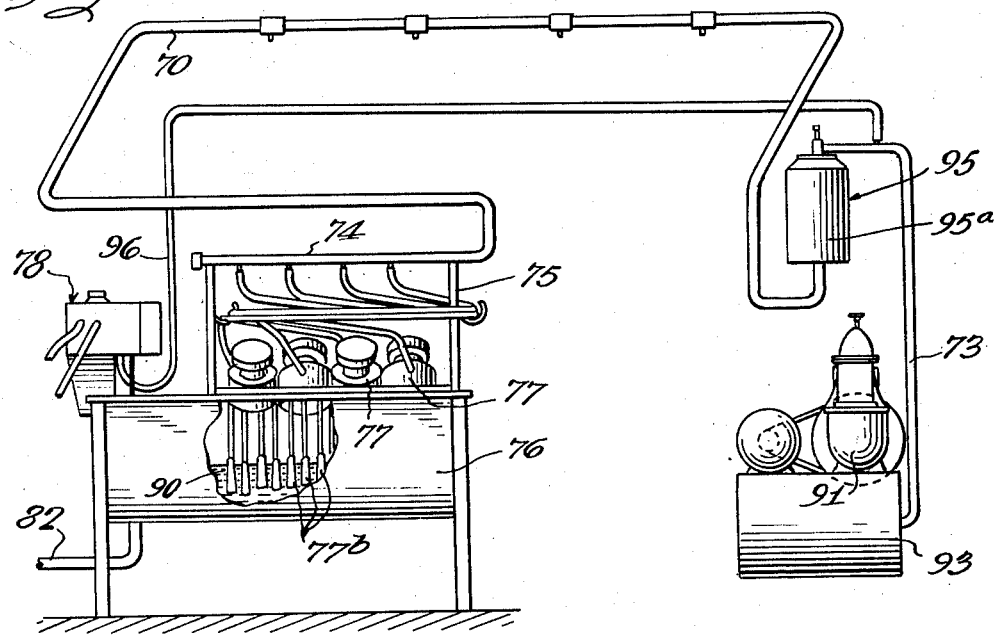
Figure 3 is a diagrammatic view of still another milk pipe line washing system embodying the invention.

The illustrations of various milk pipe line washing systems in Figures 1, 2 and 3 of the drawings are intended to be diagrammatic only and do not necessarily show the normal physical relationships of the elements as they are found in practice. Where the physical relationship of the various elements of the system may be important to the operation thereof, it will be pointed out specifically.

Referring now to Figure 1, a milk pipe line 20 is shown which is provided with a plurality of individual stall cocks or valves 21 which have nipples 21a to which the milk hoses of the milk withdrawing apparatus may be connected during milking. In general during the washing operation these valves are closed although they may be opened momentarily to effect washing of the interior of the valves. Further details of the construction and operation of the stall cocks may be found in copending Thomas application, Serial No. 319,812, filed November 12, 1952, and assigned to the assignee of this application, and matured as Patent No. 2,783,771.

One end of pipe line 20 opens into milk receiver 22 to which a vacuum line 23 is also connected. (However, in this system no vacuum is applied to the line during the washing operation.) A manifold 24 connected to the bottom of receiver 22 is mounted on a rack 25 over washing solution reservoir 26. Milk withdrawing units 27, which may be of the general type disclosed in copending Thomas applications, Serial No. 237,922, filed July 21, 1951, now Patent No. 2,709,416, and Serial No. 219,692, filed April 6, 1951, now Patent No. 2,706,965, both assigned to the assignee of this application, are also mounted on rack 25 in inverted position with the teat cup assemblies hanging downwardly into the reservoir (see Figure 2) and the milk hoses 27a wound on suitable hooks provided on the rack and connected to nipples 24a of manifold 24. The washing control unit, indicated generally as 28, is mounted on the end of reservoir 26.

A centrifugal pump 29, which is driven by electric motor 30, has an inlet connected through a short length of pipe 31 to reservoir 26 and when operating forces the washing solution from the reservoir through pipe line 20, receiver 22, manifold 24 and milking apparatus 27 back into the reservoir.

After each given washing solution has circulated through the system for the desired length of time (as five minutes for an initial rinse, twenty minutes for the detergent solution and five minutes for the sanitizing solution) pump 29 is stopped and a valve associated with reservoir drain 32 is opened. This permits the washing solution in reservoir 26 to drain therefrom and also most of the washing solution in pipe line 20 to flow through receiver 22 and into the reservoir. It is to be understood that in general the outlet of pump 29 is connected through a generally upright section of pipe 33 to the high end of the milk pipe line so that this flow will take place by gravity.

In order to facilitate the drainage of the pipe line it is desirable to provide an automatic vent valve 34 connected to the pipe line, preferably at a relatively high point spaced from the reservoir. Vent valve 34 includes a check valve which closes while pump 29 is operated forcing the washing solution through the system under pressure but it opens and vents the system to atmosphere as soon as this pressure is relieved, greatly speeding the draining process. Further details of the construction and operation of vent 34 may be found in copending Merritt application, Serial No. 456,359, filed September 16, 1954, and assigned to the assignee of this application, and matured as Patent No. 2,800,134.

Pump 29, which is normally periodically used during milking for pumping milk from receiver 22 to a holding container (not shown) is at the low point of the system and is provided with a check valve in the outlet to prevent loss of vacuum during the milking operation. In order to prevent this check valve from trapping washing solution in upright member 33, auxiliary drain valve assembly 35 is connected to the pipe line immediately adjacent the outlet of pump 29, as through a coupling 36, and to drain 32 through a short connector 37. The auxiliary drain valve is associated, through the control unit, with the main drain valve, as will hereinafter appear, in such a manner that the valves both open on completion of a washing solution circulating cycle permitting complete draining of the pipe line and pump. If washing solution were permitted to remain in the pump, milk flowing therethrough at the next milking might be contaminated.

Referring now to Figure 2, wherein another milk pipe line washing system is illustrated, reference numerals twenty higher than those used in Figure 1 will be used to indicate like parts. The system of Figure 2 utilizes a combination of a pump and vacuum for effecting circulation of washing solutions through the pipe line.

The pipe line 40 is again provided with a plurality of spaced stall cocks 41 to which the milk hoses 47a of the milking units 47 may be secured during the milking operation. One end of the pipe line 40 is connected directly to manifold 44 mounted on rack 45 and extending over washing solution reservoir 46. The teat cups 47b of the milk withdrawing units hang down into the washing solution 60 in the reservoir. A source of vacuum including a vacuum pump 61 driven by electric motor 62 and a vacuum reservoir tank 63, is connected through vacuum line 43 to milk receiving chamber 42. The vacuum acts through pipe line 40 drawing the washing solution through the milk withdrawing units 47, manifold 44 and the pipe line into receiver 42. The inlet of pump 49 is connected to the outlet at the bottom of milk receiver 42 and the pump operates continuously to transfer the washing solution therefrom through upright outlet pipe 53 back to reservoir 46. A valve 64 is provided in pump outlet connection 53 to throttle the pump so that washing solution is drawn through the pipe line into receiver 42 at a slightly greater rate than it is pumped from the receiver into reservoir 46 when the receiver is under vacuum.

Since the washing solution enters receiving tank 42 slightly faster than it is removed therefrom, the receiving tank, after initially filling, will remain full of washing solution to wash thoroughly all milk contacted surfaces therein. However, after tank 42 is filled, the washing solution will also begin to fill vacuum line 43. A vacuum control apparatus indicated generally as 65 and comprising a float-operated vent, is connected in vacuum line 43 and relieves the vacuum by venting the system to atmosphere when washing solution has risen to a predetermined level in tank 65a. With the receiver thus vented to atmosphere inflow thereto from pipe line 40 is reduced and, since pump 49 continues to operate and withdraw solution from the receiver 42, the washing solution in tank 65a and line 43 then flows back into milk receiver 42 until the level of solution in the tank falls to a predetermined level causing the vent to close. Further details of the construction and operation of vacuum control apparatus 65 are set forth in copending Thomas application, Serial No. 435,812, filed June 10, 1954, and assigned to the assignee of this application.

Washing control unit 48 is again mounted adjacent reservoir 46 and controls the preparation and circulation of the desired washing solutions and effects draining of the pipe line at the proper time. In this system both liquid pump 49 and vacuum pump 61 are turned off during the draining of the system and, as in the system of Figure 1, reservoir drain 52 and auxiliary drain 55, connected to the outlet of pump 49 open to effect the draining. In addition, a point in the evacuated portion of the system is connected through suitable means as hose 66 to a vacuum relief valve in control unit 48. Not only are the drains open but the pipe line is vented automatically by the operation of control unit 48 to effect rapid draining of the system.

Turning now to Figure 3, a washing system in which vacuum alone is used to effect circulation of the washing solution is illustrated. Reference numerals thirty higher than those used in Figure 2 will be used to indicate similar elements.

Pipe line 70 is connected at one end to manifold 74 mounted above washing solution reservoir 76. Milk withdrawal units 77 are again mounted on rack 75 with the teat cups 77b hanging down into washing solution 90. The other end of pipe line 70 is connected through vacuum control unit 95 and vacuum line 73 to vacuum tank 93 which is evacuated by a pump 91.

Control unit 78 again controls the preparation of washing solutions, the circulation thereof through the system by controlling vacuum pump 91 and the draining of the system through drain 82. Vacuum control unit 95 is similar in construction to the control unit 65 of Figure 2 but operates in a slightly different manner in this system. Here the washing solution is drawn through milk withdrawing units 77 and pipe line 70 into tank 95a until a float therein operates to open a vacuum vent valve whereupon the washing solution flows back out of the tank pipe line 70 and into reservoir 76. The washing solution is repeatedly flushed back and forth through the pipe line 70 effecting washing thereof. Preferably, the vacuum vent control 75 is so designed that pipe line 70 is substantially completely emptied of washing solution on each cycle of the apparatus as it has been found that crevices and pockets in the pipe line which become filled with stagnant washing solution are often not adequately cleaned. The vacuum vent connection of control unit 78 is here connected through hose 96 to the vacuum line 73. While hose connection 96 is here shown as extending substantially the length of the pipe line system it is to be understood that these figures are diagrammatic and in practice control unit 78 might be mounted quite close to vacuum line 73 as a few feet therefrom.

Having described in general several illustrative carryaway milk pipe line washing systems, the automatic washing control unit and the associated apparatus will now be described in detail. Elements which have previously been assigned a reference numeral will be referred to by the numeral used the first time they were mentioned.

Figure 10:
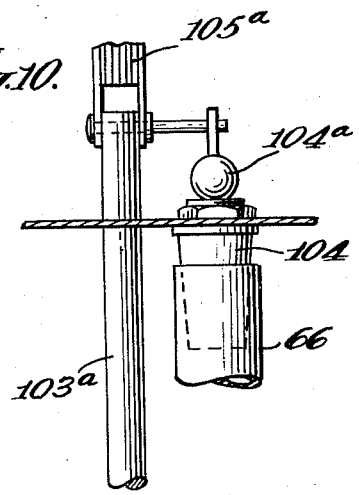
Figure 10 is a fragmentary detail view of a vent valve for use with vacuum-operated washing systems.
Figure 5:
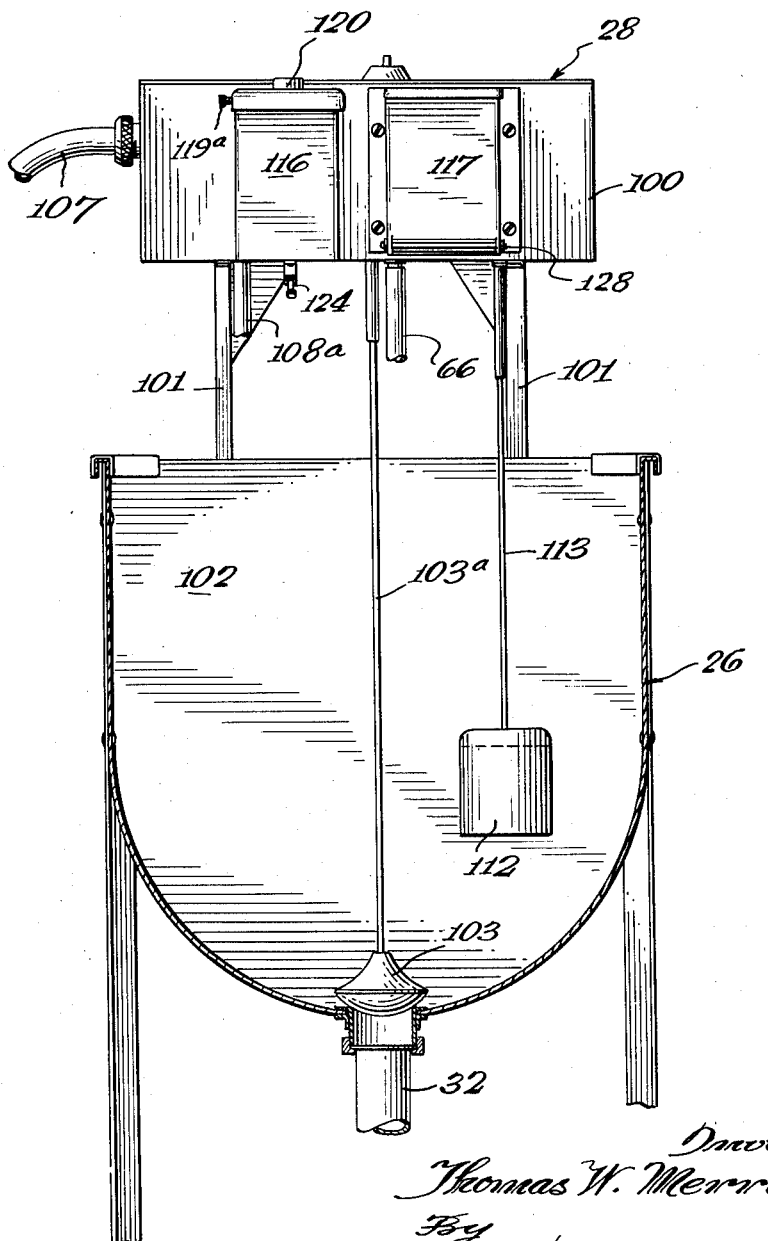
Figure 5 is a vertical sectional view taken substantially along the line 5—5 of Figure 4.
Figure 6:
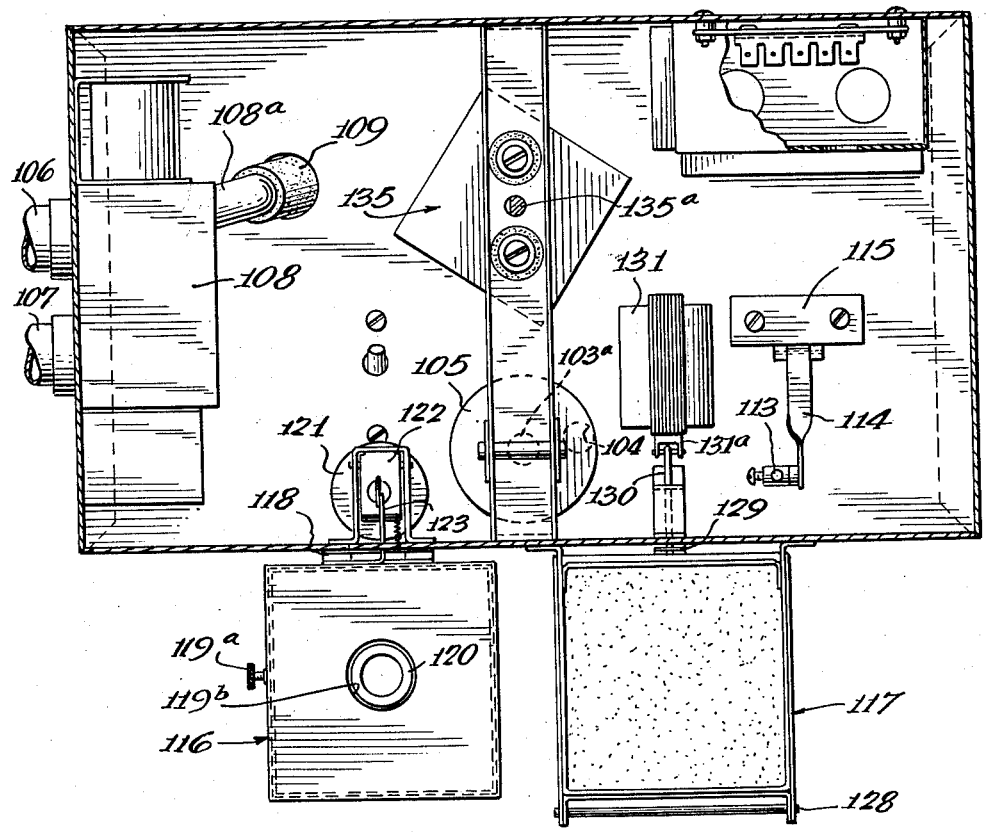
Figure 6 is a top plan view of the control unit with the cover removed.
Figure 7:
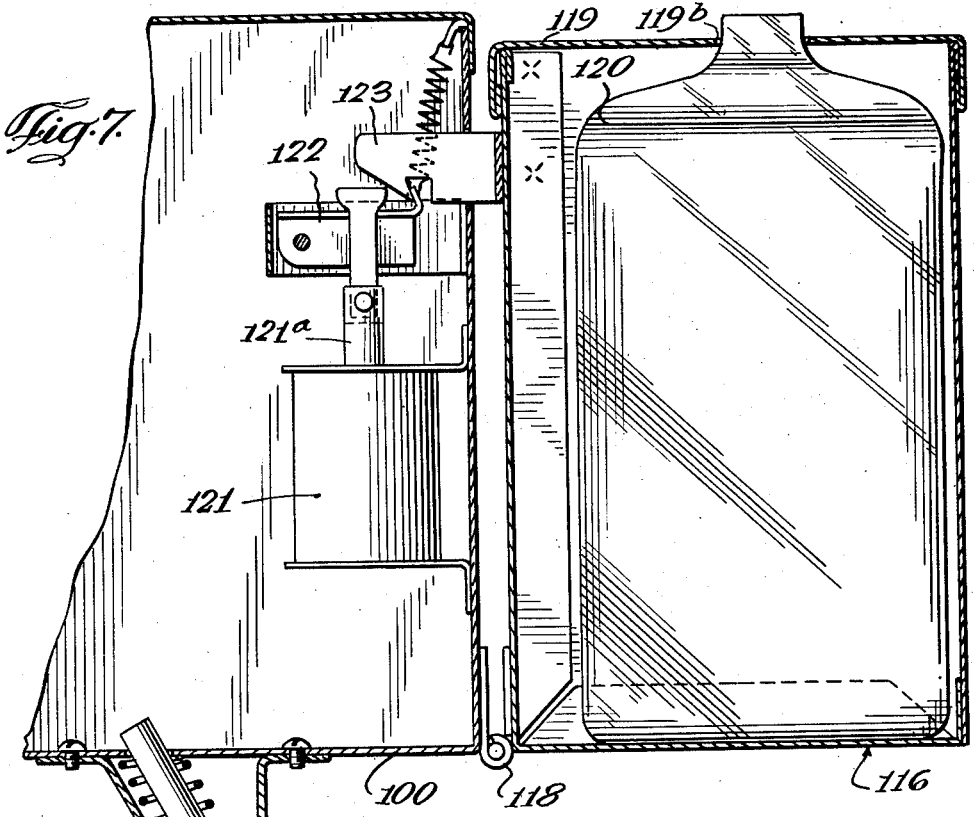
Figure 7 is an enlarged fragmentary sectional view of the sanitizer container.
Figure 8:
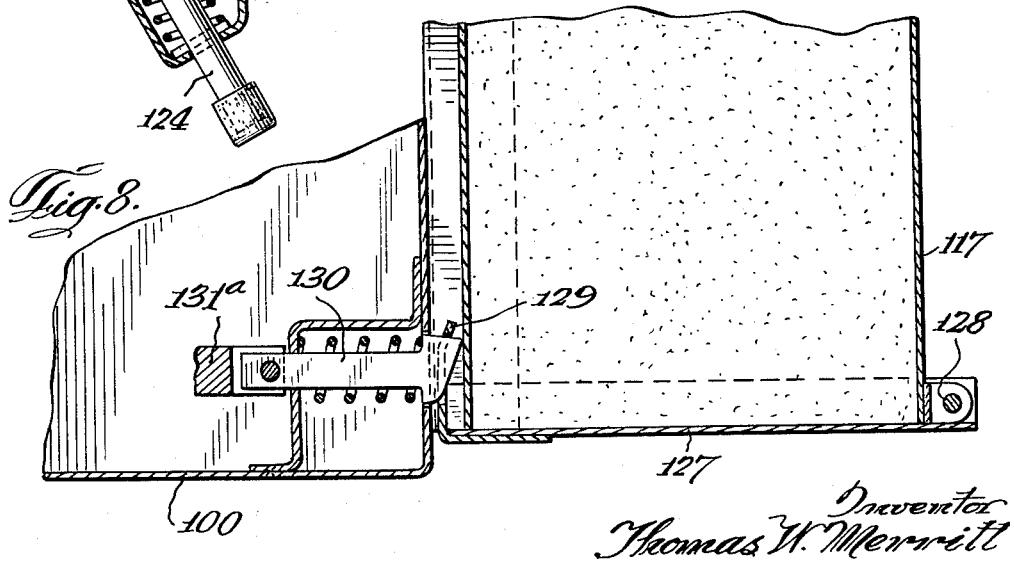
Figure 8 is an enlarged fragmentary sectional view of the detergent container.

Control unit 28 provides an electrically timed control which after being started, fills reservoir 26 with water of proper temperature, adds any further necessary materials to make the desired washing solutions, controls the circulation of the solutions through the pipe line for the necessary predetermined period of time and drains the system after each of the various washing steps have been completed. Referring more particularly to Figures 4 and 5, control unit 28 is contained in a housing 100 mounted on brackets 101 above end member 102 of washing solution reservoir 26. Reservoir 26 is preferably a stainless steel tank having a capacity of at least one and one-half to two times the amount of washing solution necessary to fill the pipe line system; i.e., the pipe line and other associated apparatus such as the milk receiver 22 or vacuum vent control tank 65a which may be filled during the washing operation. Reservoir 26 has a drain connection 32 in the bottom thereof adjacent end member 102 over which control unit 28 is mounted. A stopper 103 for closing reservoir drain 32 is mounted at the end of a rod 103a which extends upwardly into control unit housing 100 where it is mechanically secured to the armature 105a of an electrically operated solenoid 105 (Figures 6 and 10). At all times except when solenoid 105 is energized (as will be discussed later) stopper 103 closes reservoir drain 32.

A nipple 104 is provided on the bottom of housing 100 adjacent drain solenoid 105 and has attached thereto the vacuum vent line 66 which is used in vacuum-operated washing systems. A valve member 104a is carried by armature 105a of the drain solenoid and seats on nipple 104 closing the vacuum vent line except when the solenoid is energized. Thus when drain 32 is opened at the end of the period of washing solution circulation the evacuated portion of the washing system is simultaneously vented to atmosphere.

Sources of hot and cold water are connected to the control unit 28 through hoses 106 and 107 which are secured to a thermostatically controlled and electrically operated mixing valve 108. Outlet 108a of valve 108 extends through an opening in the bottom member of control unit housing 100, to deliver water from the valve into reservoir 26.

The level of water in reservoir 26 is controlled by float 112, carried at the lower end of rod 113 which extends into control unit housing 100 and is connected through arm 114 to a double-throw switch assembly 115.

Mounted on the side of control unit housing 100 and extending over reservoir 26 are two containers 116 and 117 for additive materials which are mixed with the water in the reservoir to form desired washing solutions. Container 116 is a stainless steel box which is pivotally mounted to housing 100 by a hinge 118 at the lower edge thereof. A removable cover 119 is held in place by retainer screw 119a. A bottle 120, preferably of a plastic material, is placed inside container 116 and has an open mouth which extends through opening 119b in the cover. Bottle 120 is filled with a suitable sanitizing preparation (as a strong chlorine solution) which is added to the water in reservoir 26 to provide a washing solution for sanitizing the milking system. An electrically operated solenoid 121 mounted on the inside wall of housing 100 has an armature 121a connected to a pivoted, spring-biased latch 122 which engages a catch 123 carried by container 116 and extending through the wall of the housing. When solenoid 121 is energized latch 122 is pulled downwardly releasing container 116 to pivot about hinge 118 emptying the contents of bottle 120 into the reservoir. A spring-biased rubber tipped bumper 124 limits the movement of container 116 when released.

Additive container 117 is particularly adapted for introducing a powdered or granular detergent preparation into reservoir 26. The container is preferably open topped and has a bottom member 127 pivotally connected to container 117 by hinge 128 at the outer edge thereof. The inner edge (inner with respect to control unit housing 100) is provided with a catch 129 which extends upwardly in a space between container 117 and housing 100 where it is engaged by a spring-biased latch 130. Latch 130 is connected to the armature 131a of another solenoid 131 upon energization of which the bottom member 127 of container 117 is released emptying the detergent into reservoir 26.

Figure 11:
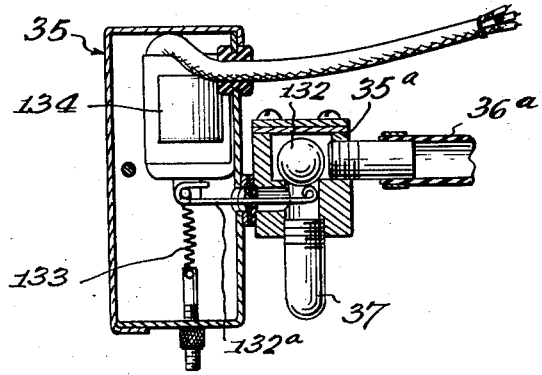
Figure 11 is a sectional detail view of an auxiliary drain unit for use with systems utilizing a circulating pump.

The auxiliary drain indicated generally as 35 in Figures 1 and 2 is shown in more detail in Figure 11. A connection, as hose 36a, connects the inlet of valve housing 35a with the low point of the system, the outlet of pump 29, through coupling 36. A valve member 132 within the valve housing is adapted to seat in the valve outlet which is in turn connected through coupling 37 to reservoir drain 32. A valve member operating arm 132a extends into housing 35a and under the influence of adjustable spring 133 urges the valve member away from its seat in the valve outlet. Solenoid 134 is connected to valve operating arm 132a and when energized overcomes spring 133 permitting valve member 132 to seat. As will be apparent later in connection with the discussion of the control circuit, solenoid 134 is energized for the short time at the start of each period of washing solution circulation allowing the valve to seat. After pump 29 begins operating the pressure of the washing solution on valve member 132 is sufficient to keep it seated and solenoid 134 may be deenergized. As soon as the pump stops operating at the end of the washing solution circulation period, bias spring 133 acting through operating arm 132a forces valve member 132 away from its seat and allows washing solution collecting on the outlet side of pump 29 to drain from the milk contacted portions of the system. Auxiliary drain 35 is described and claimed in greater detail in copending Merritt application, Serial No. 471,739, filed November 29, 1954, and assigned to the assignee of this application.

Referring now to the schematic circuit diagram, Figure 9, the operation of the system will be described. A timer unit 135 (Figure 6) includes a motor 136 which drives four cams 137, 138, 139 and 140. The four cams and the various switches operated thereby are shown in the positions they are in at the start of the washing cycle. The control system is energized by attaching leads 141 to a suitable source of power, as conventional 110 volts A.C. Operation of the system is initiated by closing line switch 142 which is preferably associated with timer shaft 135a (Figure 6) so that it may be closed by pushing down on timer dial 135b (Figure 4); and conversely pulling up on the timer dial opens switch 142 and stops the washing operation at any desired point.

When line switch 142 is closed, a circuit is completed through contact 115a of the float switch (which is closed if there is no water in reservoir 26) and contact 148a associated with cam 138 energizing warm water control solenoid 143. The operation of warm water solenoid 143 in conjunction with mixing valve 108 causes reservoir 26 to fill with water of predetermined temperature, preferably about 105° F., for the initial rinse. When the level of water in tank 26 has risen to the predetermined point, float 112 rises causing contact 115a to open, stopping the flow of water and causing contact 115b to close. A circuit is completed through contact 115b energizing timer motor 136 which drives the four cams in a counterclockwise direction as shown herein. As the cams begin to turn, switch 147 associated with cam 137 is closed providing a holding circuit for energizing timer motor 136 (switch 115b opens shortly after circulation of the washing solution starts). After the initial movement of the cams, cam 139 closes switch contact 149b completing a circuit energizing a relay 144 which in turn energizes the motor or motors associated with the washing solution circulating means. In the systems shown in Figures 1-3, this would be either or both the liquid pump motor or the vacuum pump motor depending on the system in use. It should be noted that during the filling of tank 26 and the initial portion of the circulating cycle switch contact 150a is closed energizing auxiliary drain solenoid 134.

After the rinse water has been circulated through the system for a predetermined period of time, as five minutes, switch contact 149a opens. At the same time, switch contact 150b closes energizing drain solenoid 105, opening drain 32, and permitting the washing solution to drain from the system. Of course auxiliary drain 35 also opens at this time. The timer continues to run during this period, allowing sufficient time, as three minutes for the system to drain. After the system has drained switches 147 and 150b are once again opened, stopping timer motor 136 closing drain 32. At the same time switch 148a is closed energizing detergent solenoid 131 and hot water solenoid 146. The hot water solenoid is associated with mixing valve 108, opening only the hot water side thereof to fill reservoir 26 with water heated to any temperature the operator may desire, as 180°, and preferably at least 160°. The hot water mixes with the detergent forming the second washing solution to be circulated. Again after reservoir 26 is filled switch 115a is opened stopping the flow of hot water and switch 115b is closed again starting timer motor 136. After a minute, switch 149b is closed and the hot detergent solution is circulated for at least twenty minutes after which time contact 149a is again opened deenergizing motor relay 144. Similarly, at the end of the period of circulation of the detergent solution drain solenoid 105 is energized removing stopper 103 from drain 32.

After the system has had time to drain, warm water and auxiliary drain solenoids 143 and 134 respectively are once again energized through switch contacts 115a, 148b and 150a while at the same time sanitizer solenoid 121 is energized, through contact 149a, emptying bottle 120 of the sanitizer into reservoir 26. After the reservoir has filled with water contact 115a opens breaking the energization circuit for warm water solenoid 143 and contact 115b closes once again starting the timer motor. The sanitizing solution is circulated for a period of at least five minutes and the system again drained. At the end of this last draining period both switch contacts 148a and 148b are opened so that reservoir 26 is not again filled with water.

In those areas where it is necessary to sanitize the system immediately before milking the last washing solution may be a plain water rinse if desired; and in any event just before the next milking the timer may manually be turned a few degrees whereupon switch contact 148b is again closed energizing warm water solenoid 143 and once again filling the reservoir. The sanitizing preparation may be added to the water in the reservoir manually for this operation. In other respects the system operates in the same manner as that previously described, the sanitizing solution being circulated for a period of about five minutes and the system then drained.

While I have shown and described certain embodiments of my invention, it is to be understood that it is capable of many modifications. Changes therefore, in the construction and arrangement may be made without departing from the spirit and scope of the invention as disclosed in the appended claims.

I claim:

1. In a milk pipe line washing system including a carry-away milk pipe line, a source of water, a reservoir for washing solution and having a drain, and means for circulating washing solution through the pipe line, a control unit of the character described, comprising: a housing mounted on said reservoir and extending thereabove; a timer in said housing; temperature sensitive valve means in said housing responsive to said timer for controlling the flow of water from said source, said valve means having an outlet for directing said water into said reservoir; a plurality of containers for additive materials mounted on said housing and extending over said reservoir; latch means in said housing and responsive to said timer for selectively causing said additive containers to empty into said reservoir, the materials mixed with water therein forming washing solutions; means responsive to said timer for controlling said circulating means; a solenoid in said housing and energized by said timer; a stopper for said drain; a stopper arm extending upwardly from said stopper and into said housing for operation by said solenoid, the timer controlling the sequential preparation, circulation and drainage of the plurality of washing solutions.

2. In a milk pipe line washing system including a carry-away milk pipe line, a source of water, a reservoir for washing solution and means for circulating washing solution through the pipe line, a control unit of the character described, comprising: a housing mounted on said reservoir and extending thereabove; a timer in said housing; valve means responsive to said timer for controlling the flow of water from said source to said reservoir; a plurality of containers for additive materials mounted on said housing and extending over said reservoir; latch means responsive to said timer for selectively causing said additive containers to empty into said reservoir, the materials mixed with water thereby forming washing solutions; means responsive to said timer for controlling said circulating means; and drain means responsive to said timer for emptying said reservoir and pipe line, the timer controlling the sequential preparation, circulation and drainage of the plurality of washing solutions.

3. In a milk pipe line washing system including a carry-away milk pipe pipe line, a source of water, a reservoir for washing solution, said reservoir having a drain, and means for circulating washing solution and rinse water through the pipe line, a control unit of the character described, comprising: a housing mounted on the edge of said reservoir and above said drain; a timer in said housing; valve means mounted in said housing and responsive to said timer for controlling the flow of water from said source, and having an outlet for directing water into said reservoir; a supply of additive material; means responsive to said timer for adding said material to the reservoir to form washing solution; a solenoid in said housing and energized by said timer; a stopper for said drain; a stopper arm extending upwardly from said stopper and into said housing for operation by said solenoid, the timer controlling the sequential circulation and drainage of rinse water and preparation, circulation and drainage of a washing solution.

4. A system of the character described for washing a carry-away milk pipe line, comprising: a reservoir associated with said pipe line for holding a quantity of washing solution; a source of vacuum connected to the pipe line for drawing washing solution from the reservoir and through the pipe line; a pump having an inlet connected to the end of the pipe line to which the source of vacuum is connected and an outlet for returning the washing solution to the reservoir; and means for automatically filling the reservoir with water, introducing desired additives thereto, controlling said pump and source of vacuum and draining the reservoir and pipe line.

5. In a milk pipe line washing system, including a carry-away milk pipe line, a source of water, a reservoir for washing solution and means for circulating washing solution from the reservoir through the pipe line, control apparatus including: a timer; valve means connected with said source of water and responsive to said timer for controlling the flow of water from said source into said reservoir; means responsive to said timer for separately introducing different additive materials to the system to form washing solutions; a drain for said reservoir; valve means for said drain including a stopper and an arm extending upwardly therefrom; and a solenoid connected to said timer and mounted on said reservoir, the solenoid having an armature connected to said arm, the timer controlling the preparation, circulation and drainage of the plurality of washing solutions.

6. In a milk pipe line washing system, including a carry-away milk pipe line, a source of water, a reservoir for washing solution and means for circulating washing solution from the reservoir through the pipe line, control apparatus including: a timer; valve means connected with said source of water and responsive to said timer for controlling the flow of water from said source into said reservoir; means responsive to said timer for introducing additive materials to the system to form washing solutions; a float in said reservoir; and means actuated by said float for terminating the flow of water into the reservoir when it reaches a predetermined point and for initiating operation of the timer to control the circulation of solutions through the system.

7. In a milk pipe line washing system, including a carry-away milk pipe line, a source of water, a reservoir for washing solution and means for circulating washing solution from the reservoir through the pipe line, control apparatus including: a timer; valve means connected with said source of water and responsive to said timer for controlling the flow of water from said source into said reservoir; means responsive to said timer for introducing additive materials to the system to form washing solutions; a float in said reservoir; and a switch controlled by the float and connected to the timer for terminating the flow of water to the reservoir and starting said timer to control the period of circulation of the washing solutions.

8. In a milk pipe line washing system, including a carry-away milk pipe line, a source of water, a reservoir for washing solution and means for circulating washing solution from the reservoir through the pipe line, control apparatus including: valve means connected with said source of water for controlling the flow of water from said source into said reservoir; means for introducing additive materials to the system to form washing solutions; a drain for said system; and a timer for controlling the operation of said valve means, additive means and drain to effect the sequential preparation, circulation and drainage of the plurality of predetermined washing solutions, said timer having a first cycle portion for effecting a first rinse, a wash and a second rinse of the system, and having a second cycle portion for effecting a sanitizing rinse of the system, said timer including switch means which open, stopping the timer at the end of each cycle portion.

9. A system of the character described for washing a carry-away milk pipe line, comprising: means for introducing washing water to said pipe line; means for introducing an additive material to said water to form a washing solution; a source of vacuum connected with said pipe line for circulating the washing solution therethrough; a drain valve for emptying said pipe line; a vent valve for relieving vacuum in said pipe line during draining; and a timer for controlling the filling of the reservoir with water, the introduction of additive thereto, the circulation of washing solution through the line and draining of the line, said timer actuating the drain and vent valves at substantially the same time.

10. In a milk pipe line washing system, including a carry-away milk pipe line, a source of water, a reservoir for washing solution and means for circulating washing solution from the reservoir through the pipe line, control apparatus including; a timer; valve means connected with said source of water and responsive to said timer for controlling the flow of water from said source into said reservoir; means responsive to said timer for introducing additive material to the system to form a washing solution; means for measuring the quantity of water in said reservoir; and means actuated by said measuring means for terminating the flow of water into the reservoir when it reaches a predetermined point and for initiating operation of the timer to control the introduction of additive material and the circulation of solution through the system.

11. A system of the character described for washing a carry-away milk pipe line, comprising: a reservoir for washing solution connected with said pipe line; means for introducing water into said reservoir; means for introducing additive materials directly into said reservoir to form washing solutions; a drain for said system; means for circulating washing solution through the system; a timer; means for measuring the quantity of water in said reservoir; and means actuated by said measuring means for initiating operation of the timer to control the introduction of water and additive materials to said reservoir, the circulation of the washing solution from the reservoir through the pipe line, and the operation of said drain.

References Cited in the file of this patent

UNITED STATES PATENTS

| | | |
|---|---|---|
| 695,323 | Mittinger | Mar. 11, 1902 |
| 1,194,542 | Raymond | Aug. 15, 1916 |
| 1,916,806 | Myrick | July 4, 1933 |
| 2,146,929 | Bassett | Feb. 14, 1939 |
| 2,195,615 | Chamberlin | Apr. 2, 1940 |
| 2,222,516 | Powell | Nov. 19, 1940 |
| 2,222,676 | Mahler | Nov. 26, 1940 |
| 2,319,795 | Coffin | May 25, 1943 |
| 2,536,695 | Ratner | Jan. 2, 1951 |
| 2,551,379 | La Raus | May 1, 1951 |
| 2,558,628 | Redin | June 26, 1951 |
| 2,597,359 | McDonald | May 20, 1952 |
| 2,624,352 | Illian | Jan. 6, 1953 |
| 2,680,445 | Hemminger | June 8, 1954 |
| 2,708,448 | Reeve | May 17, 1955 |